United States Patent
Dowling et al.

(10) Patent No.: US 10,853,105 B2
(45) Date of Patent: Dec. 1, 2020

(54) JAVA NATIVE INTERFACE AND WINDOWS UNIVERSAL APP HOOKING

(71) Applicant: Citrix Systems, Inc., Fort Lauderdale, FL (US)

(72) Inventors: Jeff Dowling, Wellington, FL (US); Abraham Mir, Wellington, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 128 days.

(21) Appl. No.: 15/710,485

(22) Filed: Sep. 20, 2017

(65) Prior Publication Data

US 2019/0087210 A1     Mar. 21, 2019

(51) Int. Cl.
| | |
|---|---|
| *G06F 9/44* | (2018.01) |
| *G06F 9/455* | (2018.01) |
| *G06F 9/30* | (2018.01) |
| *G06F 9/445* | (2018.01) |
| *G06F 9/54* | (2006.01) |

(52) U.S. Cl.
CPC ...... *G06F 9/45504* (2013.01); *G06F 9/30174* (2013.01); *G06F 9/445* (2013.01); *G06F 9/45508* (2013.01); *G06F 9/541* (2013.01)

(58) Field of Classification Search
CPC .................................................. G06F 9/45504
USPC ........................................................ 717/148
See application file for complete search history.

(56) References Cited

U.S. PATENT DOCUMENTS

| | | | | |
|---|---|---|---|---|
| 6,499,137 | B1* | 12/2002 | Hunt | ..................... G06F 9/44521 717/164 |
| 6,721,941 | B1 | 4/2004 | Morshed et al. | |
| 8,950,007 | B1* | 2/2015 | Teal | ....................... G06F 21/554 726/30 |
| 2005/0066313 | A1* | 3/2005 | Bates | .................... G06F 11/3648 717/129 |
| 2006/0190935 | A1* | 8/2006 | Kielstra | .............. G06F 9/45516 717/148 |
| 2012/0304160 | A1* | 11/2012 | Soeder | ................... G06F 9/4486 717/148 |

OTHER PUBLICATIONS

International Search Report and Written Opinion for PCT Appl. Ser. No. PCT/US2018/051136 dated Mar. 6, 2019 (19 pages).
Li et al., "An abnormal behavior detection technology for run-time mobile application", 2017 First International Conference on Electronics Instrumentation & Information Systems (EMS), IEEE, Jun. 3, 2017, pp. 1-5.
International Preliminary Report on Patentability for Int. Appl. No. PCT/US2018/051136, dated Apr. 2, 2020 (12 pages).

* cited by examiner

*Primary Examiner* — Evral E Bodden
(74) *Attorney, Agent, or Firm* — Foley & Lardner LLP

(57) ABSTRACT

Described embodiments provide systems and methods for augmentation, instrumentation, and other runtime modifications of bytecode-based applications through introduction of static and dynamic hooks. In at least one aspect, described is a system for hooking Java native interface calls from native code to Java code in a Java virtual machine. In at least one aspect, described is a system for static hooking of a Windows Universal application. In at least one aspect, described is a system for dynamically hooking a Windows Universal application.

8 Claims, 7 Drawing Sheets

JAVA NATIVE INTERFACE AND WINDOWS UNIVERSAL APP HOOKING

BACKGROUND

Computer processors execute processor-specific sets of instructions known as machine code. To execute software written in a source code programming language other than machine code, a computer program called a "compiler" may be used to convert the source code into machine code suitable for execution. Alternatively, a computer program called an "interpreter" may be used to parse the source code and execute equivalent machine code instructions without going through a compilation phase. However, both approaches have distribution limitations: machine code is processor-specific (each processor has its own set of instructions), which can limit the portability of compiled executables, and interpreters expect raw, easily modified, source code, which tends to be less user-friendly for end consumers. In a third approach, source code is converted from a programming language to an intermediary processor-agnostic "bytecode" language. The bytecode is not machine code, and can be run on a variety of platforms and processors. Although the term "bytecode" originally referred to the use of single-byte-sized operation ("op") codes, there is no requirement that bytecode use any specific sized op codes. The conversion from source code to bytecode may be performed by a computer program referred to in this document as a "bytecode compiler." To avoid confusion, this description uses the terms "native compiler" to refer to compilers that generate processor-specific output (e.g., machine code) and "bytecode compiler" to refer to compilers that generate bytecode. In this description, the term "compiler" absent the adjective "bytecode" refers to native compilers unless the context clearly indicates otherwise.

Bytecode is typically run by a virtual bytecode machine or "runtime" environment, although it may also be compiled into machine code. The runtime environment may be, for example, an interpreter executing machine code corresponding to bytecode instructions, a just-in-time ("JIT") compiler, or a virtualized simulation of a physical machine, e.g., incorporating virtualized memory locations and a virtualized processor that accepts bytecode as its machine language instruction set. Examples include the Common Language Runtime ("CLR") and the Java Runtime Environment ("JRE"), which includes a Java Virtual Machine ("JVM"). Because the bytecode is not tied to any particular processor, it may be distributed to (and executed by) any computer processor for which a runtime environment, virtual bytecode machine, compiler, or interpreter is available. Furthermore, bytecode can be easily distributed, similar to a fully native compiled executable. While bytecode can be read and modified by programmers, it is less susceptible to modification and more user-friendly than raw source code.

Source code is written in a programming language. Some programming languages were originally designed to be compiled into machine code (e.g., Fortran, C, and C++); some programming languages were originally designed to be interpreted (e.g., BASIC, Lisp, and Perl); and some programming languages were originally designed to be converted to bytecode (e.g., Java, which uses Java Bytecode, and .NET Framework languages such as Visual Basic .NET and C#, which use the Common Intermediate Language ("CIL") bytecode, as defined by the Common Language Infrastructure ("CLI") and originally known as the Microsoft Intermediate Language ("MSIL")). Some languages, e.g., Clojure, can even be converted into both Java bytecode and CIL bytecode. However, interpreters have been developed for some compiled languages, native compilers have been developed for some interpreted languages, and bytecode compilers have been developed for languages that were not originally designed for bytecode (e.g., Python can be processed by an interpreter or converted into Python bytecode). Accordingly, while this description primarily uses Java and .NET Framework languages as examples, the subject matter described may apply to any language for which a bytecode compiler is available.

Some compilers generate object code or other intermediary code. Some compilers convert a first programming language into another intermediary programming language. For example, early C++ compilers converted C++ code into C code, then compiled the C code into assembly language, and then converted the assembly language to machine language. In some instances, a separate linker is used to package together compiler output into a standalone executable. These intermediary stages should not be confused with converting source code into a processor-agnostic bytecode. However, there are some similarities between modern bytecodes and classical assembly language. For example, CIL was designed as a processor-agnostic assembly language and there are native compilers that take CIL input. Where appropriate, some of the subject matter described may apply to intermediary code that is not strictly bytecode.

Some bytecode-based programming languages (including Java, via the Java Native Interface ("JNI")) allow processor-specific compiled code ("native code") to interact with processor-agnostic bytecode. The native code may be executing outside the scope of the runtime environment (e.g., external to the JVM). Code written for conversion into CIL bytecode is sometimes referred to as "managed code," distinguishing it from native code. The term "managed code" is used in this description to refer to bytecode and to code written for conversion into bytecode, including but not limited to CIL and Java bytecodes. Interactions between native code and managed bytecode present several complications for designers, developers, and users of such software.

It is desirable to be able to augment, instrument, monitor, debug, or otherwise modify execution of software. For example, it can be useful to inject hooks into software that allow additional visibility into a process, redirect resource access events, manage input data, extend functionality, or that otherwise facilitate debugging, malware analysis, process isolation, security enforcement, or other such objectives. Bytecode runtime environments are not positioned to inject hooks into native code executed outside the runtime environment. This creates a technical problem for injecting hooks.

These and other technical problems are addressed by the subject matter described.

SUMMARY

This Summary is provided to introduce a selection of concepts in a simplified form that are further described below in the Detailed Description. This Summary is not intended to identify key features or essential features, nor is it intended to limit the scope of the claims included herewith.

In at least one aspect, described is a system for hooking Java native interface calls from native code to Java code in a Java virtual machine. The system includes a Java Native Interface ("JNI") dynamic hook configured to intercept a call from native code to a pre-determined Java function within a Java Virtual Machine ("JVM"). In some embodiments, the JNI dynamic hook is implemented in Java code. In some embodiments, the predetermined Java function within the JVM comprises Java code. In some embodiments, the JNI dynamic hook is configured to determine that a target method of the predetermined Java function is statically hooked via a hook lookup function and, responsive to the determination, to call a static hook method identified via the hook lookup function. In some embodiments, the static hook method is configured to forward the call to the target method.

In at least one aspect, described is a system for static hooking of a Windows Universal application. The system includes an application wrapping tool, executable on a processor, coupled to memory, and configured to identify an install package file stored in storage for a Windows Universal application, modify the identified install package file to inject a new dynamically linked library ("DLL"), include in bytecode of the Windows Universal application one or more calls to the injected new DLL, and generate a modified install package for the Windows Universal application. The injected DLL is loaded in the Windows Universal application as one of a dependency or a reference.

In at least one aspect, described is a system for dynamically hooking of a Windows Universal application. The system includes a Windows Universal application, executable on a processor, coupled to memory and configured to load a plurality of source dynamically loaded libraries (DLLs) in memory. The system further includes a hooking loader configured to load into memory upon execution of the Windows Universal application and initialize a hooking framework. The hooking framework is configured to identify the plurality of source dynamically loaded libraries (DLLs) to hook with a plurality of target DLLs, and the hooking framework is configured to overwrite an address of each of the plurality of source DLLs within an import address table in memory of the Windows Universal Application to point to a corresponding target DLL of the plurality of target DLLs. Responsive to the overwrite, the Windows Universal application becomes configured (while executing in memory) to use the plurality of target DLLs instead of the plurality of source DLLs.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

The subject matter described covers topics that, among other things, enables augmentation, instrumentation, and other runtime modifications of bytecode-based applications. The bytecode-based applications execute on computing devices, which may be any processor-based device that executes instructions.

Figure 1A:
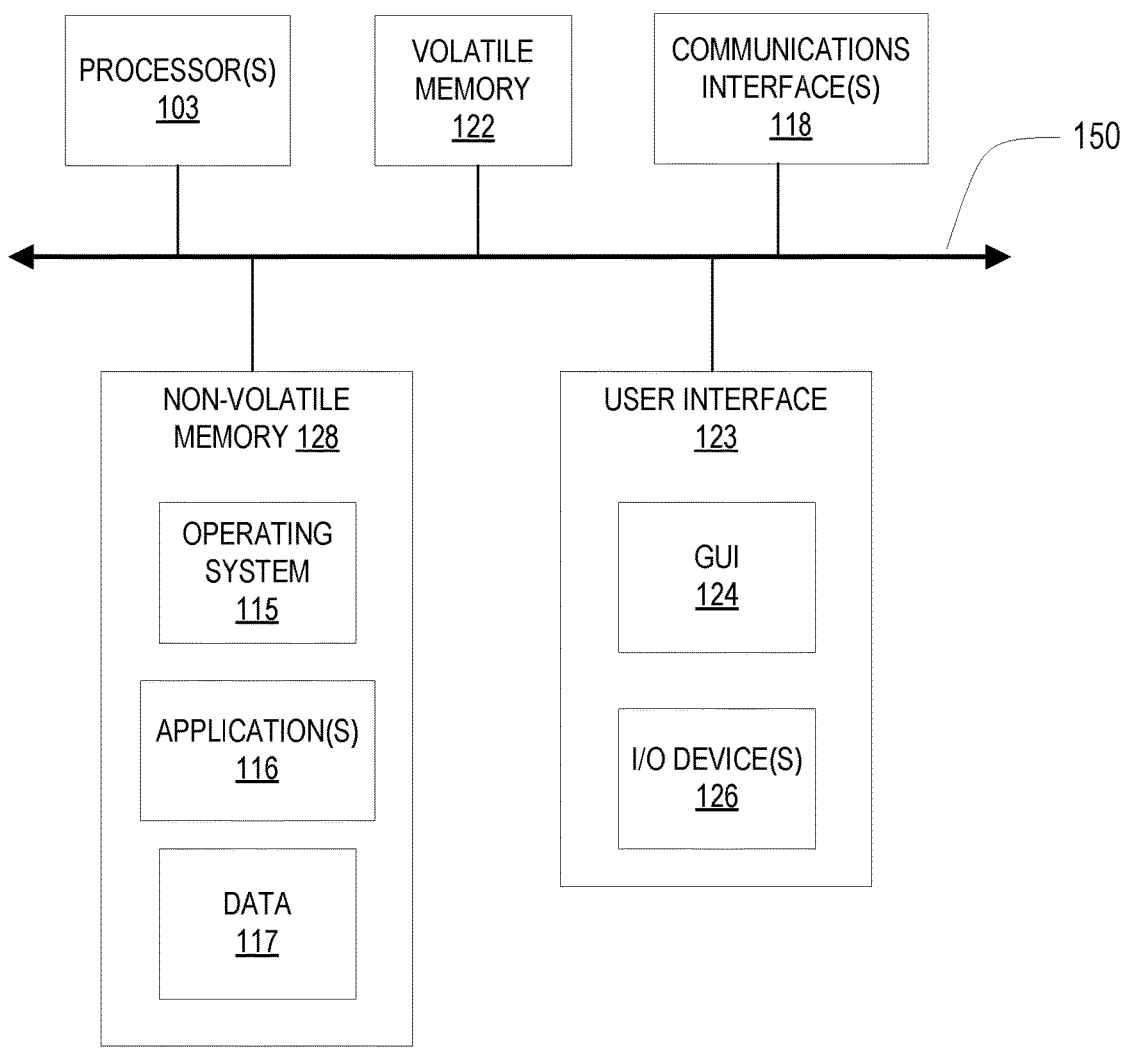
FIG. 1A is a block diagram of an example computing device, in accordance with an illustrative embodiment.

FIG. 1A is a block diagram of an example computing device 101, in accordance with an illustrative embodiment. The computing device 101 may be any kind of computing device, including, for example, a desktop computer, a laptop or notepad computer, a thin client, a mobile device such as a tablet or electronic "pad," a smart phone or data phone, a gaming system, or any other device capable of the functions described herein. Some example computing devices receive input from a user and present output to the user. The illustrated example computing device 101 includes one or more processors 103, volatile memory 122 (e.g., RAM), non-volatile memory 128, user interface ("UI") 123, one or more communications interfaces 118 (e.g., a network interface card ("NIC")), and a communication bus 150. The user interface 123 may include hardware for a graphical user interface ("GUI") 124 (e.g., a touchscreen, a display, etc.), one or more input/output ("I/O") devices 126 (e.g., a mouse, a keyboard, a speaker, etc.). Non-volatile memory 128 stores an operating system 115, one or more applications 116, and data 117 such that, for example, computer instructions of operating system 115 and/or applications 116 are executed by processor(s) 103 out of volatile memory 122. Data 117 may be entered using an input device of GUI 124 or received from I/O device(s) 126. Various elements of the computing device 101 may communicate via communication bus 150. The computing device 101 as shown in FIG. 1A is shown merely as an example, as computing devices may be implemented by any computing or processing environment and with any type of machine or set of machines that may have suitable hardware and/or software capable of operating as described herein.

The processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more of an application specific integrated circuit ("ASIC"), microprocessor, digital signal processor, microcontroller, field programmable gate array ("FPGA"), programmable logic arrays ("PLA"), multi-core processor, or general-purpose computer processor with associated memory. The "processor" may be analog, digital, or mixed-signal.

The communications interface 118 may include one or more interfaces to enable the computing device 101 to access a computer network 104 such as a local area network ("LAN"), a wide area network ("WAN"), or the Internet through a variety of wired and/or wireless or cellular connections. In some embodiments, the communications interface 118 includes one or more network connection points (ports) and an interface controller. Network connection points may be wired connection points (e.g., Ethernet ports) or wireless (e.g., radio circuitry for Wi-Fi or mobile network communications). For example, a computing device 101 may exchange information over a network using protocols in accordance with the Open Systems Interconnection ("OSI") layers, e.g., using an OSI layer-4 transport protocol such as the User Datagram Protocol ("UDP") or the Transmission Control Protocol ("TCP"), layered over an OSI layer-3 network protocol such as Internet Protocol ("IP"), e.g., IPv4 or IPv6. In some embodiments, the client device 102 supports network communication using Secure Socket Layer ("SSL") or Transport Layer Security ("TLS"), which encrypts communications layered over a reliable transport protocol (such as TCP). In some embodiments, the computing device 101 is a thin-client, or functions as a thin-client, executing a thin-client protocol or remote-display protocol such as the Independent Computing Architecture ("ICA") protocol created by Citrix Systems, Inc. of Fort Lauderdale, Fla. The ICA protocol allows presentation at a client computing device 101 of software executing remotely (e.g., at a server computing device 101), as though the remotely executed software were executed locally on the client computing device 101.

The non-volatile memory 128 may include one or more of a hard disk drive ("HDD"), solid state drive ("SSD") such as a Flash drive or other solid state storage media, or other magnetic, optical, circuit, or hybrid-type storage media. In some embodiments, the non-volatile memory 128 includes read-only memory ("ROM"). In some embodiments, storage may be virtualized, e.g., using one or more virtual storage volumes, such as a cloud storage, or a combination of such physical storage volumes and virtual storage volumes.

In described embodiments, a first computing device 101 (e.g., a server) may execute an application on behalf of a user of a second computing device 101 (e.g., a client device). For example, the first computing device may execute a virtual machine providing an execution session within which applications execute on behalf of a user of the second computing device. For example, the first computing device may provide a hosted desktop session, may execute a terminal services session to provide a hosted desktop environment, or may provide access to a computing environment including one or more of: one or more applications, one or more desktop applications, and one or more desktop sessions in which one or more applications may execute. For example, in some embodiments, the client device is a thin-client, or functions as a thin-client, executing a thin-client protocol or remote-display protocol such as the Independent Computing Architecture ("ICA") protocol created by Citrix Systems, Inc. of Fort Lauderdale, Fla.

Figure 1B:
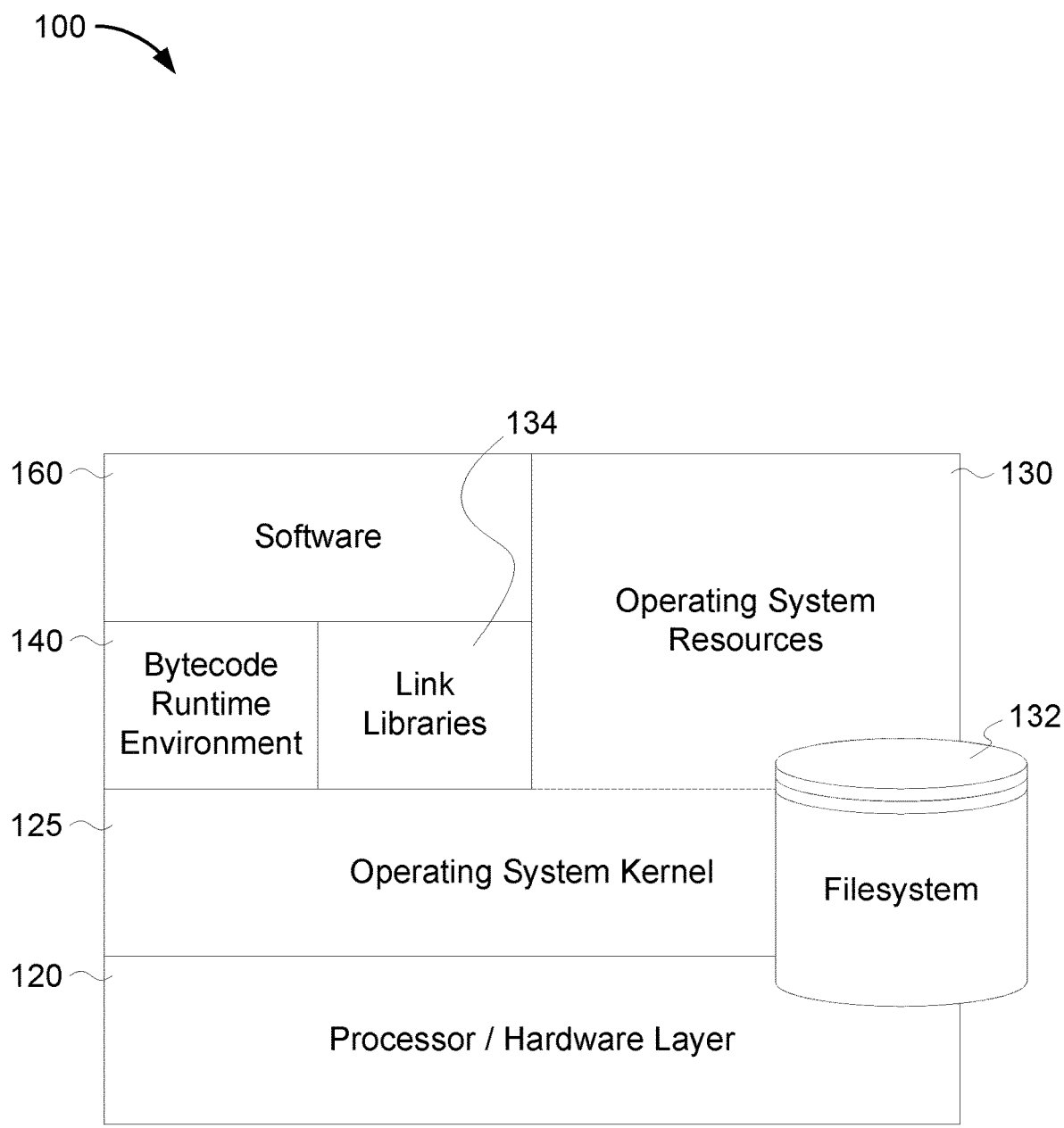
FIG. 1B is a block diagram of an example execution environment, in accordance with an illustrative embodiment.

FIG. 1B is a block diagram of an illustrative execution environment 100, which includes an operating system kernel 125 layered over the processor and hardware layer 120 (e.g., the example computing device 101 shown in FIG. 1A). In some embodiments, the operating system 115 shown in FIG. 1A is confined to the operating system kernel 125. In some embodiments, the operating system 115 shown in FIG. 1A includes operating system resources 130 separate from, or in addition to, the operating system kernel 125. The operating system 115 provides, for example, a filesystem 132 that includes a software interface to a controller for access to data stored in physical memory, e.g., data 117 stored in non-volatile memory 128 as shown in FIG. 1A. The execution environment 100 includes one or more dynamic link libraries ("DLL") 134 such as device controllers, libraries for application programming interfaces ("API"), system libraries, and libraries for shared resources. Some DLLs 134 may be included with the operating system 115. Some DLLs 134 may be installed with application or hardware installations. The execution environment 100 includes a bytecode runtime environment 140, which may include, for example, a Java Virtual Machine ("JVM") or a Virtual Execution System ("VES") such as the Common Language Runtime ("CLR") or "Mono". As described in more detail herein, the bytecode runtime environment 140 executes software 160 by processing the bytecode and executing corresponding machine code at the processor and hardware layer 120.

In some embodiments, the bytecode runtime environment 140 includes a Java Virtual Machine ("JVM"). In some implementations of the JVM, a class loader process Java bytecode input. The class loader may parse and verify input data, e.g., confirming that bytecode adheres to a particular standard. The class loader also initializes data structures, objects, and any variables declared in the input data. The JVM may include virtualized memory, which may be divided up, e.g., into a method area, a process heap, data registers, and one or more stacks. Each execution thread will have its own call stack allocated in the virtualized memory. An execution engine processes bytecode instructions from a call stack and populates the virtualized memory accordingly. The execution engine may also handle interactions with the Java Native Interface ("JNI"), e.g., facilitating calls to or from various native method libraries and dynamic link libraries ("DLL").

In some embodiments, the bytecode runtime environment 140 includes a Common Language Runtime ("CLR"). In some implementations of the CLR, a just-in-time ("JIT") compiler compiles CIL bytecode input as needed.

In some embodiments, the bytecode runtime environment 140 includes a compiler. In some embodiments, the bytecode runtime environment 140 compiles Java bytecode and/or CIL bytecode into machine code for native execution. This compilation may be comprehensive at the start of execution or "just-in-time" compilation as execution progresses. In some instances, bytecode may be compiled prior to execution. For example, some implementations of the ANDROID runtime ("ART") compile applications into native code for native execution at installation time.

Figure 1C:
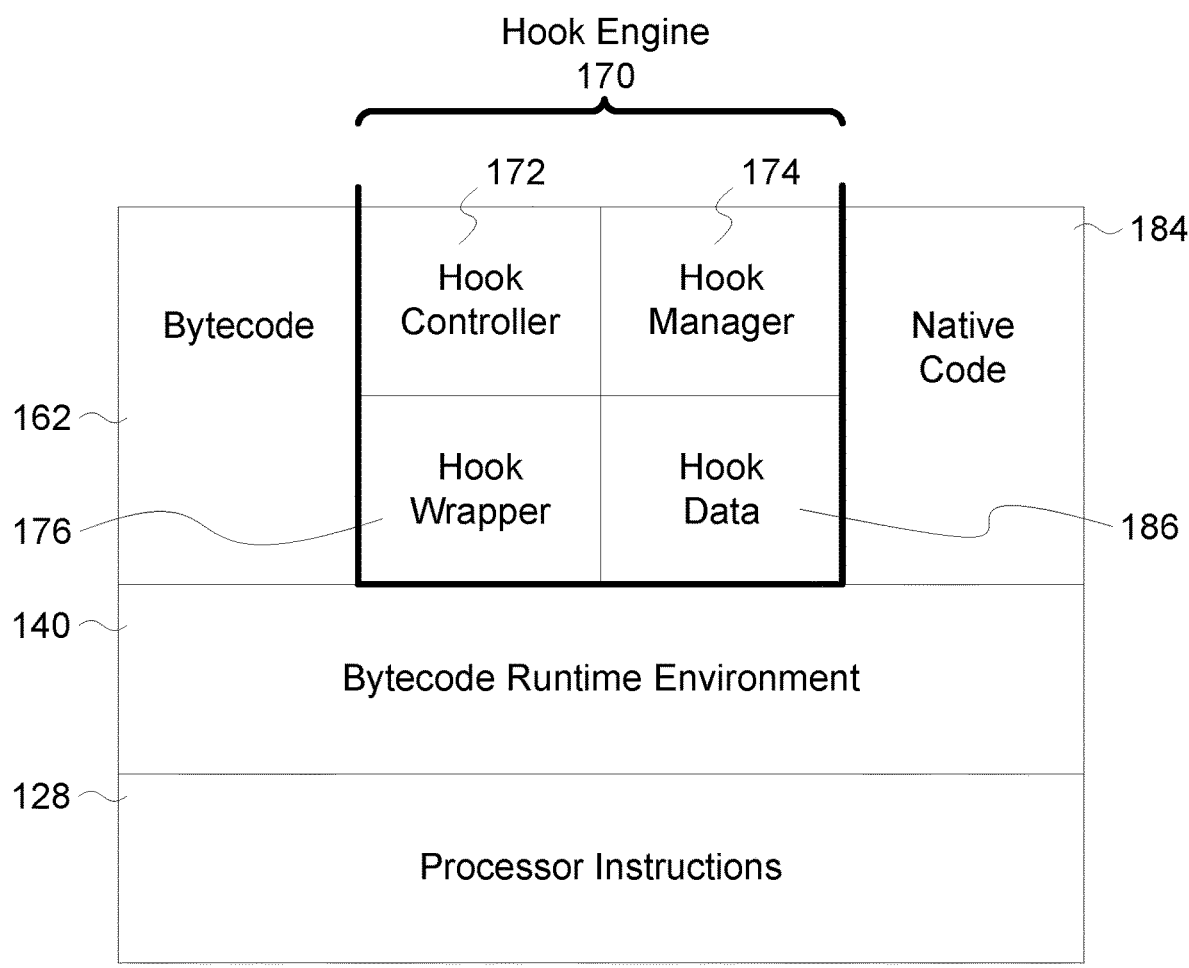
FIG. 1C is a block diagram of an example hook engine, in accordance with an illustrative embodiment.

FIG. 1C is a block diagram of an example hook engine 170. In some embodiments, the bytecode runtime environment 140 includes the hook engine 170. As shown in FIG. 1C, the hook engine 170 includes a hook controller 172, a hook manager 174, and one or more hook wrappers 176. The hook engine 170 manages hook data 186 for hooking function calls between native code 184 (e.g., code from DLLs 134) and bytecode 162 (e.g., code from software 160). As presented in more detail below, the hook engine 170 uses the hook controller 172 to configure the hook wrappers 176, which intercept calls between the native code 184 and the bytecode 162. In some embodiments, the hook wrappers 176 intercept all such calls; in some embodiments, a hook wrapper 176 is configured to intercept only specific calls. For each intercepted call, the hook manager 174 determines, from the hook data 186, how to handle the intercepted call. For example, in some embodiments, the hook data 186 may forward some intercepted calls to their respective target destinations while redirecting other intercepted calls to alternative destinations, as indicated by the hook data 186.

The hook controller 172 configures the hook wrappers 176 to intercept calls between the native code 184 and the bytecode 162. In some embodiments, the hook controller 172 is integrated into the bytecode runtime environment 140. In some embodiments, the hook controller 172 is an add-on loaded by the bytecode runtime environment 140 or loaded by a bytecode-based application at runtime. In some embodiments, the hook controller 172 configures the hook wrappers 176 by injecting one or more dynamic libraries into a bytecode-based application. In some embodiments, the hook controller 172 configures the hook wrappers 176 by injecting one or more dynamic libraries into the memory space of a bytecode-based application.

The hook wrappers 176 intercept calls between the native code 184 and the bytecode 162. In some embodiments, a hook wrapper 176 includes a set of static hooks each corresponding to a respective application programming interface ("API") instruction for a native interface. For example, the Java Native Interface ("JNI") includes a standard set of API instructions that native code 184 may use to interact with bytecode 162. For example, code written in C or C++ can interface with Java's virtual machine via JNI, e.g., to instantiate Java classes and call methods. Many of these JNI functions have names beginning with "Alloc," "New," or "Call," and these are referred to herein generally as alloc, new, and call functions. In some embodiments, the hook wrapper 176 includes a set of static hooks corresponding to all or some of the standard JNI instructions.

The hook manager 174 uses the hook data 186 to determine how to handle each intercepted call. For example, in some embodiments, the hook data 186 may indicate one or more of: to generate an event record corresponding to the intercepted call, to redirect the intercepted call to an alternate function, to redirect the intercepted call to an alternate memory address, to forward the intercepted call to its original destination, to block the intercepted call, and so forth. In some embodiments, the hook data 186 might not include instructions corresponding to a particular intercepted call, in which case the hook manager 174 may apply a default handling to the particular intercepted call, e.g., forwarding it to its original destination. In some embodiments, the hook data 186 may include instructions for dynamic resolution of intercepted call handling. For example, in some embodiments, the hook manager 174 may resolve a redirect destination for an intercepted call at runtime There is a JNI call function for each combination of call type, return type, and parameter bundle type. For example, the JNI call "CallNonvirtualBooleanMethodV" can be used to call any non-virtual Boolean method using parameters passed in via a va_list. The parameters specify the exact non-virtual Boolean method to call. The JNI Call functions are designed to be generic enough to be used to call any class and method. The supported call types for Java are virtual and static, however, certain types of native code (e.g., code in C/C++) can make non-virtual calls invoking a method that is not necessarily the child-most implementation in an object-oriented inheritance hierarchy. Because each JNI call may correspond to any number of bytecode functions, the hook manager 174 uses the hook data 186 to determine whether the actual target of the JNI call is intended to be hooked. For example, the hook data 186 may include a set of identifiers for the functions to be hooked. In some embodiments, when the intercepted JNI call is not intended to be hooked, the hook manager 174 forwards the intercepted to call to its initial destination, and if the intercepted call is intended to be hooked, the hook manager 174 invokes the hook.

Although JNI is specific to Java, and thus to the Java Virtual Machine, a similar approach may be used for other bytecode runtime environments, e.g., a Virtual Execution System ("VES") such as the Common Language Runtime ("CLR"). For example, the hook controller 172 may be configured to inject additional dynamic load libraries ("DLL"s) into CIL bytecode 162, where the additional DLLs include a hook wrapper 176. The hook wrapper 176 intercepts calls and either statically redirects hooked calls or, as discussed in reference to JNI intercepts, relies on the hook manager 174 to dynamically resolve destinations for hooked calls using the hook data 186. In addition, by modifying the bytecode 162, the hook controller 172 may substitute hooked versions of standard DLLs, introducing the ability to hook calls from the bytecode 162 to native code 184.

MICROSOFT provides a native API for "Windows Universal" applications called the Universal Windows Platform ("UWP"). UWP applications may be run on a variety of MICROSOFT platforms. UWP is based on the Windows Runtime ("WinRT"), which is platform-agnostic within the set of supported platforms. UWP may be developed in managed code languages such as C# and Visual Basic .NET (VB.NET). Further, UWP may be developed in other languages, such as C++, using the UWP API libraries (e.g., using the WINDOWS 10 SDK). UWP applications are packaged into bundles for installation via an application store. In some instances, the application code is compiled into one or more machine-specific native codes for inclusion in the installation package. For example, .NET native may be used to compile. In some instances, UWP applications developed with CIL compatible languages (e.g., C#), may be packaged in processor-agnostic bytecode form, e.g., for debug sideload versions. The UWP API libraries act, in certain respects, like a native interface.

The hook data 186 indicates, to the hook manager 174, which instructions are to be hooked and how the hooks should be handled. In some embodiments, the hook data 186 is stored using a database, e.g., using a Relational Database Management System ("RDBMS"). In some embodiments, the hook data 186 is stored in one or more structured data files, e.g., eXtensible Markup Language ("XML") files. In some embodiments, the hook data 186 is stored in one or more of relational databases, object oriented databases, document oriented databases, XML databases, or other data management systems.

Figure 2:
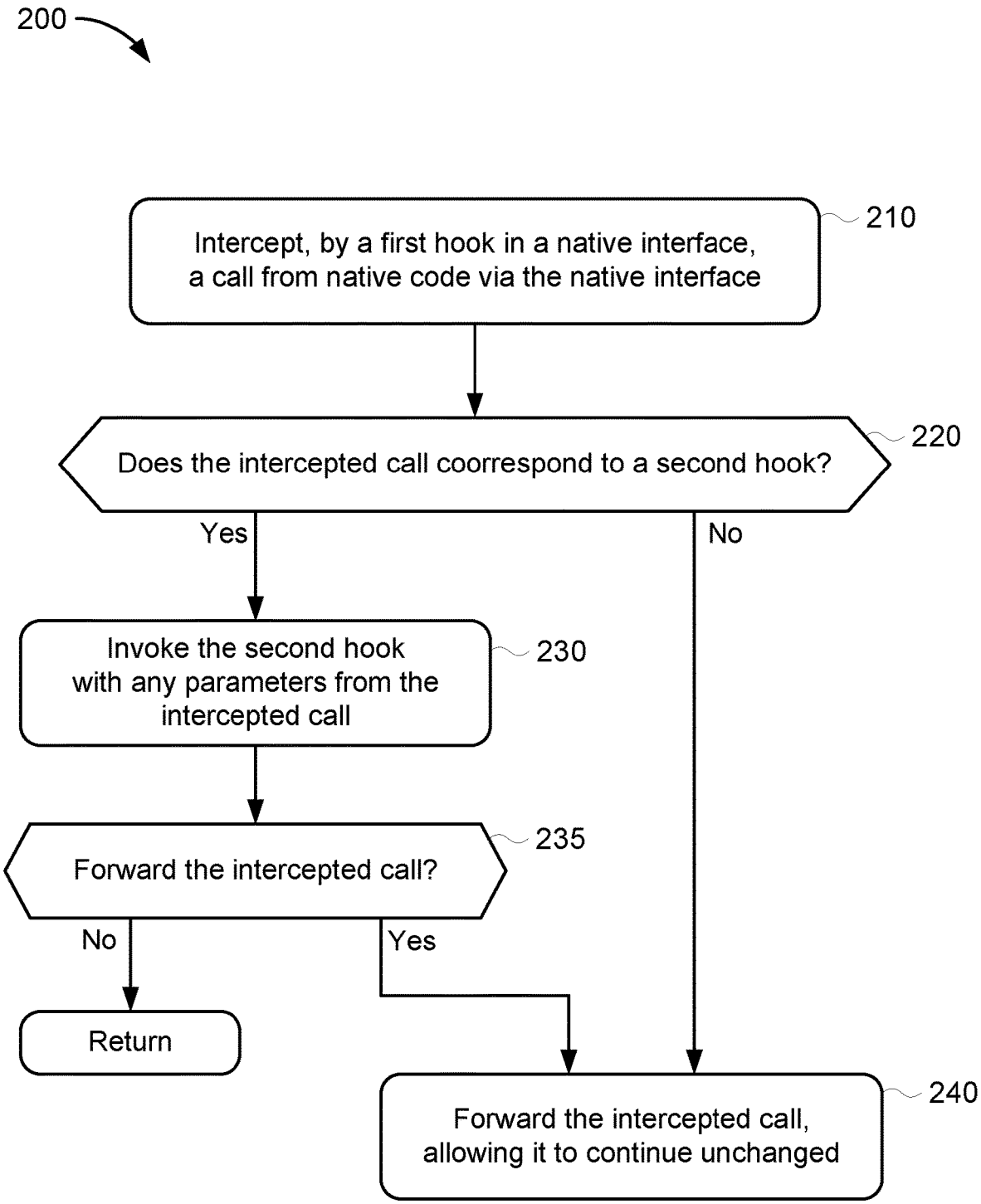
FIG. 2 is a flowchart for an example method for hooking native code calls to managed bytecode.

FIG. 2 is a flowchart for an example method 200 for hooking native code calls to managed bytecode. In broad overview of the method 200, at stage 210, a hook engine 170 intercepts, using a first hook injected into a native interface, a call from native code via the native interface. At stage 220, the hook engine 170 determines whether the intercepted call corresponds to a second hook and, if not, at stage 240 the hook engine forwards the intercepted call, allowing to continue unchanged. Otherwise, if the hook engine 170 determined at stage 220 that the intercepted call corresponds to a second hook, then at stage 230, the hook engine 170 invokes the corresponding second hook and passes it any parameters from the intercepted call. In addition, in some embodiments, at stage 230, invoking the second hook includes passing it a name or identifier for the intercepted call. At stage 235, the hook engine 170 determines whether to forward the intercepted call and, if so, at stage 240 the hook engine forwards the intercepted call.

Referring to FIG. 2 in more detail, at stage 210, the hook engine 170 intercepts, by a first hook in a native interface, a call from native code 184 via the native interface. In some embodiments, the hook engine 170 injects hooks into the native interface (e.g., modifying a library for the native interface) and the hooks are triggered on interface calls. When triggered, the hooks intercept calls via the native interface.

At stage 220, the hook engine 170 determines whether the intercepted call corresponds to a second hook. In some embodiments, the hook engine 170 maintains a table of hook data 186. When a call is intercepted where the call includes data mapping to a hook in the hook data 186, the hook engine 170 identifies the correspondence. If the hook engine 170 determines that the intercepted call corresponds to a second hook then, at stage 230, the hook engine 170 invokes the corresponding second hook and passes in any parameters from the intercepted call. For example, a look-up in the hook data 186 may return a hook function identifier to invoke, an memory address for a hook function, or a memory address for a library call, e.g., an address for a function in a dynamic link library ("DLL"). If no hook function is identified as stage 220, then the hook engine 170 forwards the intercepted call at stage 240, allowing the call to continue unchanged.

At stage 230, the hook engine 170 invokes the second hook, with any parameters from the intercepted call, responsive to a determination at stage 220 that the intercepted call corresponds to the second hook. In some embodiments, in a non-void calling context, a return value from the second hook is returned to the caller. In some embodiments, the original function call is still processed by its own code. For example, some hooks may monitor and/or report function calls without interfering with execution (as compared to some hooks, which may substitute code for the hooked call). At stage 235, the hook engine 170 determines (e.g., from the hook data 186) whether to forward the intercepted call.

At stage 240, the hook engine 170 forwards the intercepted call to its initially intended destination. In some instances, the forwarded call is unchanged. That is, the hook engine 170 may allow some intercepted calls to continue unchanged, as though never hooked.

To forward a non-virtual call, a static hook calls a C/C++ function. Before a non-virtual call is redirected to a static hook, the target method info is stored in the current thread's context. The C/C++ non-virtual call forwarding function retrieves the target info and then forwards the call to the correct target.

Figure 3:
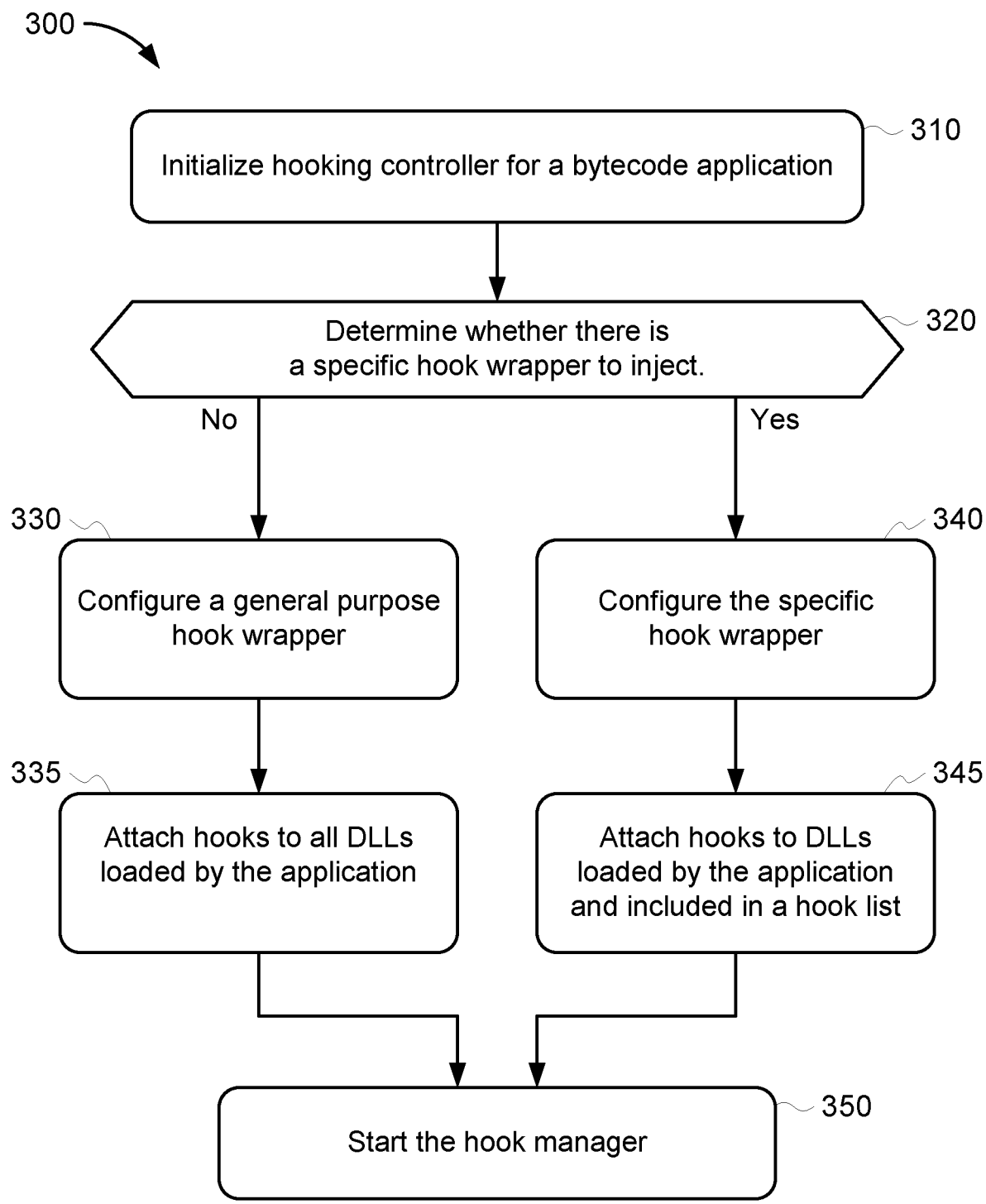
FIG. 3 is a flowchart for an example method of applying hook wrappers to a bytecode application.

FIG. 3 is a flowchart for an example method 300 of applying hook wrappers to a bytecode application. In broad overview of the method 300, at stage 310, a hook engine 170 initializes a hook controller 172 for a bytecode application. At stage 320, the hook controller 172 determines whether there is a specific hook wrapper to inject and, if not, then at stage 330 the hook controller 172 configures a general purpose hook wrapper and at stage 335 attaches hooks to all DLLs loaded by the application. If, at stage 320, the hook controller 172 determines that there is a specific hook wrapper to inject, then at stage 340, the hook controller 172 configures the specific hook wrapper and, at stage 345, attaches hooks to DLLs loaded by the application that are also included in a hook list. At stage 350, the hook engine 170 starts the hook manager 174.

Referring to FIG. 3 in more detail, at stage 310, a hook engine 170 initializes a hook controller 172 for a bytecode application. The hook controller 172 is responsible for injecting hook wrappers 176 into the application, each hook wrapper 176 corresponding to a set of functions to be hooked, e.g., functions in a DLL or in a replacement "hooked" DLL.

At stage 320, the hook controller 172 determines whether there is a specific hook wrapper to inject. In some instances, a special "hooked" DLL is available, wherein functions defined by the DLL have been modified, e.g., to provide hooks. The modifications may facilitate, for example, monitoring execution (e.g., for debugging), augmenting software (e.g., adding third-party credential authentication), and so forth. In some embodiments, a hooking configuration may specify specific DLLs to inject, e.g., DLLs defining specific functions included on a list of functions to hook (a "hook list").

If, at stage 320, the hook controller 172 determines that there is no specific hook wrapper to inject, then at stage 330 the hook controller 172 configures a general purpose hook wrapper and at stage 335 attaches hooks to all DLLs loaded by the application. The general purpose hook wrapper may, for example, hook all native interface calls. For example, the wrapper may hook all calls from the Java Native Interface ("JNI") API.

If, at stage 320, the hook controller 172 determines that there is a specific hook wrapper to inject, then at stage 340, the hook controller 172 configures the specific hook wrapper and, at stage 345, attaches hooks to DLLs loaded by the application that are also included in a hook list. For example, the hooking configuration may specify a specific DLL (or a set of specific DLLs) for inclusion. For example, the hooking configuration may indicate that only a specific set of DLLs related to network functionality be hooked, and may further indicate a limited hook list of network functions.

At stage 350, the hook engine 170 starts the hook manager 174. The hook manager 174 processes intercepted hooked calls and, as previously described, redirects intercepted calls as needed.

Figure 4:
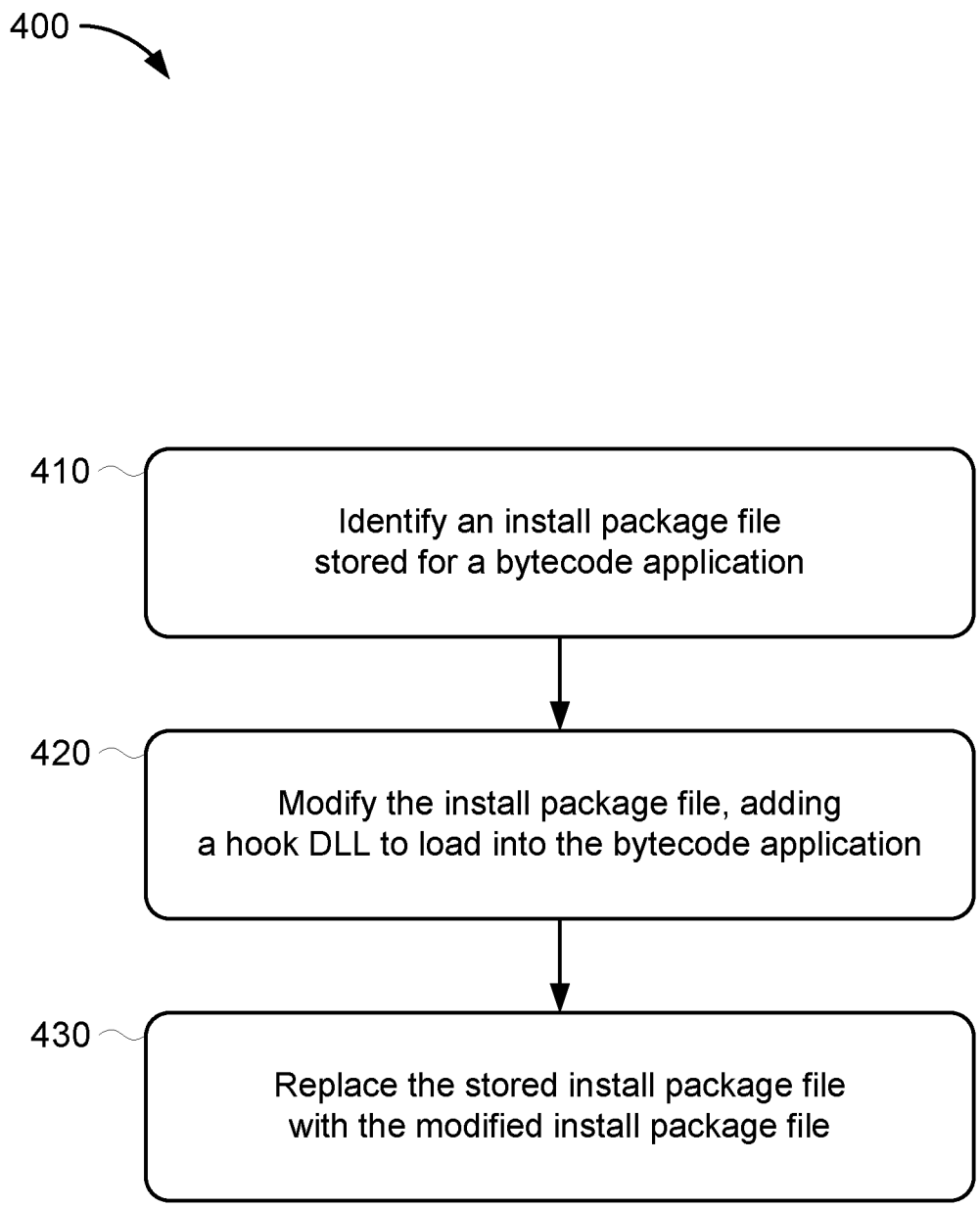
FIG. 4 is a flowchart for an example method of injecting a DLL into a bytecode-based application.

FIG. 4 is a flowchart for an example method 400 of injecting a DLL into a bytecode-based application. In broad overview of the method 400, at stage 410, a hook controller 172 identifies an install package file stored for a bytecode application. At stage 420, the hook controller 172 modifies the install package file, adding a hooked DLL to load into the bytecode-based application. At stage 430, the hook controller 172 replaces the stored install package file with the modified install package file.

Referring to FIG. 4 in more detail, at stage 410, a hook controller 172 identifies an install package file stored for a bytecode application. Some applications use an install package file to integrate the application into an execution environment. For example, on some mobile devices, an "App Store" or similar interface may execute install package files to copy executables and set configuration parameters. "Windows Universal" applications (for the Universal Windows Platform "UWP") may be written in languages that can be compiled into Common Intermediate Language ("CIL") for execution in a sandbox by a Common Language Runtime ("CLR"). "Windows Universal" applications (for UWP) may alternatively be written in non-CIL languages ("native" languages) such as C++. Some such applications written in native languages (such as C++) may link in an application programming interface ("API") for UWP. A language that can be compiled into CIL or natively compiled may be considered both a CIL language and a non-CIL native language, depending on how it is compiled. In some embodiments, dynamic hooks are injected into native code, e.g., code generated by the .NET Native compiler. In some embodiments, dynamic hooks are injected into code compiled from C or C++. In some embodiments, code for UWP applications is bundled into an install package. For example, the UWP install package may include native code compiled for a set of processors that support the Windows Runtime ("WinRT"). The install package files for UWP applications may be modified by the hook controller 172, as described.

At stage 420, the hook controller 172 modifies the install package file, adding a hooked DLL to load into the bytecode-based application. The package file may include a list of DLL identifiers, e.g., library names and/or resident memory addresses, to be loaded by the runtime environment at execution time. At stage 420, the hook controller 172 edits the list of DLL identifiers to add DLL identifiers corresponding to libraries containing hooked functions. These hooked libraries may be used in addition to, or instead of, the originally identified DLLs. In some embodiments, the hook controller 172 replaces DLL identifiers in the list with identifiers for the hooked versions.

At stage 430, the hook controller 172 replaces the stored install package file with the modified install package file. In some embodiments, the install package file is stored in resident memory, e.g., on a disk or on a Flash-type memory for long term storage. In some embodiments, the install package file is stored in an operating-system specified location (e.g., a special holding directory). The hook controller 172 replaces the stored version with the modified version of the install package file such that at execution time, the modified DLL list will be used and the application will link in the hooked libraries.

The method 400 modifies the bytecode in stored persist memory, e.g., "on disk." In some embodiments, the bytecode may be first compiled into an assembly language or even to a system-specific machine code. Even so, in some such embodiments, the method 400 may be able to modify the DLL inclusion list as described. In some embodiments, it may be preferable to dynamically modify the DLLs inclusion list, e.g., at runtime. Dynamic hooking allows for API function hooking while the application's process is running in memory. In some embodiments, dynamic hooks overwrite the in-memory Import Address Table ("IAT") for a DLL such that the IAT instead points to target "hooked" version of the DLL.

Figure 5:
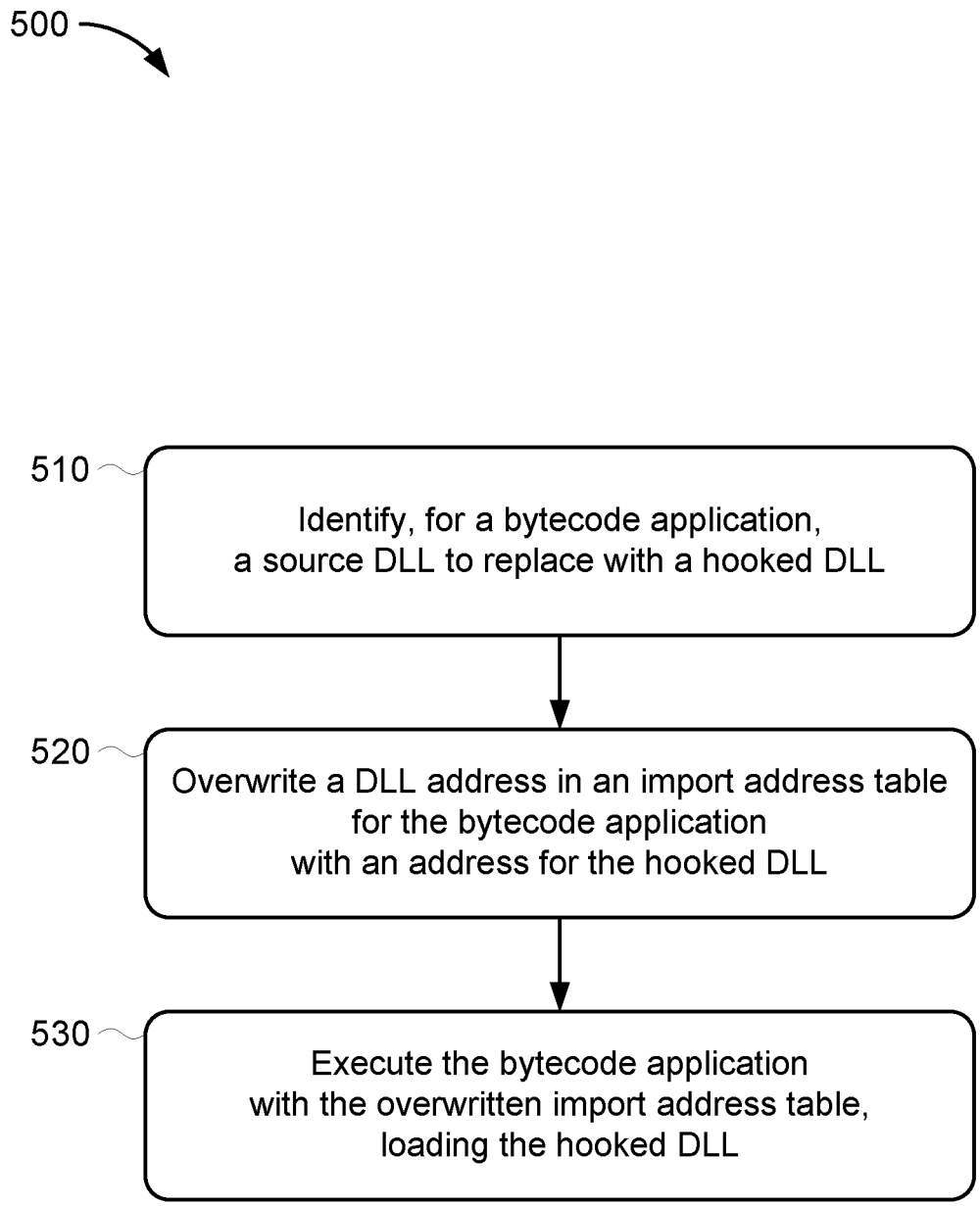
FIG. 5 is a flowchart for an example method of dynamic module import section manipulation.

FIG. 5 is a flowchart for an example method 500 of dynamic module import section manipulation. In broad overview of the method 500, at stage 510, a hook engine 170 executing in a bytecode runtime environment 140 identifies, for a bytecode application, a source DLL to replace with a hooked DLL. At stage 520, the hook engine 170 overwrites a DLL address in an import address table ("IAT") for the bytecode application with an address for the hooked DLL. At stage 530, the bytecode runtime environment 140 executes the bytecode application with the overwritten import address table, loading the hooked DLL.

Referring to FIG. 5 in more detail, at stage 510, a hook engine 170 executing in a bytecode runtime environment 140 identifies, for a bytecode application, a source DLL to replace with a hooked DLL. In some embodiments, the hook engine 170 parses the bytecode application to identify the source DLL for replacement. In some embodiments, the bytecode application is compiled into an assembly language or processor-specific machine code and the hook engine 170 parses the assembly or machine code. In some embodiments, the hook engine identifies a list of DLLs to be loaded or linked into the application, and the hook engine 170 compares the identified list to a list of available hooked DLLs, identifying any libraries present on both lists. In some embodiments, the hook engine 170 identifies an import address table ("IAT") for the bytecode application and "walks" the IAT resolving each address and identifying the targeted DLLs.

At stage 520, the hook engine 170 overwrites a DLL address in the import address table ("IAT") for the bytecode application with an address for the hooked DLL. In some embodiments, the modification to the IAT is in-memory, at execution of the application. In some embodiments, the hook engine 170 is executing within the bytecode runtime environment 140 such that it has direct access to the IAT memory.

At stage 530, the bytecode runtime environment 140 executes the bytecode application with the overwritten IAT, loading the hooked DLL. The application, having been modified at stage 520, will load the libraries indicated in the IAT and, as a result of the modification, will load the hooked versions. Modifying the IAT and executing the resulting modified application dynamically hooks the calls in the DLL.

As described above, in some embodiments a dynamic hook is applied to each Java Native Interface ("JNI") Alloc, New, and Call function at application startup. The dynamic JNI hooks intercept all calls and determine (or a hook manager determines) whether the respective target method of each intercepted call is statically hooked (or not). A call is redirected to a static hook if a match is found, otherwise it's forwarded directly to the target method. Static hooks may conditionally forward calls to the target method.

In some embodiments, before JNI hooks are applied at application startup, a collection of data structures is prepared (e.g., as hook data 186 stored by the hook engine 170). The data structures provide a mapping from application methods to static hook methods (e.g., hook=lookup(class, method)). The JNI hooks receive target object, class reference, method identifier, and method parameters from the caller. The object's class reference and method identifier are then used, by the hook engine 170, as input parameters for hook lookups. In some embodiments, where the hook lookup can be a costly operation, a cache of recent hits and misses is used to skip lookups when possible.

In some embodiments, the hook lookup operation first determines if the input class has any static hooks. If the class has hooks, the hook engine 170 traverses an object class inheritance hierarchy from child-most to parent-most. Each level is scanned for a method that matches the input method. If a method is found, a hook data structure containing class/method redirection info is returned.

Further, as described, some embodiments enable hooks within "Windows Universal" applications executed in the sandbox Universal Windows Platform ("UWP") context. As introduced above, UWP applications may be written in languages that can be compiled into Common Intermediate Language ("CIL") bytecode, as defined by the Common Language Infrastructure ("CLI") (CIL was originally known as the Microsoft Intermediate Language ("MSIL")). UWP applications may also, alternatively, be written in native languages (that is, languages such as C++ compiled into processor-specific machine code) linking in an application programming interface ("API") for the UWP. A hooking software developer kit ("SDK") for UWPs provides for augmentation and monitoring via static and/or dynamic hooks. The SDK is cross-platform, just like the CLR. For example, Windows 10 UWP components and applications run on all computing devices that support the Windows Runtime (e.g., the Windows 10 operating system), and the UWP-based Hooking SDK supports all of these devices, including, e.g., devices using INTEL x86-32, x86-64, and Advanced RISC Machines ("ARM") processors. In some implementations, static hooks use bytecode injection suitable only for use with bytecode-based applications (e.g., CIL). In some implementations, dynamic hooks are in low-level native code and can be suitable for use with both bytecode-based applications and native compiled applications such as non-CLR based UWP applications.

Some embodiments use an on-demand method of resolving and attaching hooks to delay-loaded DLLs. The Hooking SDK code directly performs activation of the delay-loaded DLLs during application startup prior to hook attachment.

Some embodiments use a deterministic process whereby the main application process's user interface ("UI") thread is halted until the hook processing is completed. This can prevent a race condition between the hooked application process's main logic flow and that of the Hooking SDK.

Some embodiments enable static hooks by performing on-disk DLL injection for Windows Universal applications. Static Hooking of UWP applications allows for modification of the application bytecode (e.g., CIL or MSIL bytecode for .NET executables), so that additional DLLs are loaded (or bootstrapped) into the application's process memory space during application load. In some embodiments, static hooks in UWP use DLL injection in the bytecode (e.g., in CIL or MSIL bytecode). In some embodiments, dynamic hooks in UWP are applied to low-level or native (machine-specific) code and work in both bytecode and non-bytecode instances (that is, in CLR and non-CLR based applications). UWP allows for "projections" for various programming languages (such as C++, JavaScript, and .NET languages like C#). Some embodiments enable dynamic hooks, e.g., performing API function hooking, while the application's process is running in memory. Because UWP applications are sandboxed, they typically cannot modify the System Registry; however, the approaches described do not rely on System Registry modifications. An application may designate an initial set of DLLs for inclusion, and the additional DLLs are loaded in addition to this initial set. In some embodiments, the additional DLLs are loaded ("injected") by a wrapping tool that takes in a Windows Universal application install package (a.k.a. AppX or AppXBundle file), modifies the file to add loading instructions for the additional DLLs, and then outputs another AppX or AppXBundle package file. In some embodiments, wrapping involves modification of an application's binary assembly manifest data to inject a new DLL to load as a dependency/reference. In addition, the target .NET application's main executable's CIL or MSIL bytecodes are modified to make calls into the injected DLL. The modifications may be made to a stored instance of the application, e.g., on-disk, as opposed to in volatile memory after loading.

Dynamic hooking allows for API function hooking while the application's process is running in memory. In some embodiments, dynamic hooks overwrite the in-memory Import Address Table ("IAT") for a DLL such that the IAT instead points to target "hooked" version of the DLL. In some embodiments, this "Module Import Section Manipulation" technique provides flexibility and effectiveness in the type and breadth of the hooks that can be attached without resorting to "Branch Instruction Redirection" techniques.

The systems and methods described may be used in a variety of embodiments. For example, and without limitation:

In at least one aspect, the above describes a system for hooking Java native interface calls from native code to Java code in a Java virtual machine. The system includes a Java Native Interface ("JNI") dynamic hook configured to intercept a call from native code to a pre-determined Java function within a Java Virtual Machine ("JVM"). In some embodiments, the JNI dynamic hook is implemented in Java code. In some embodiments, the predetermined Java function within the JVM comprises Java code. In some embodiments, the JNI dynamic hook is configured to determine that a target method of the predetermined Java function is statically hooked via a hook lookup function and, responsive to the determination, to call a static hook method identified via the hook lookup function. In some embodiments, the static hook method is configured to forward the call to the target method.

In some embodiments of the system for hooking JNI calls, the JNI dynamic hook is configured to be applied to a predetermined Java function. In some such embodiments, the predetermined function is one of an "alloc," a "new," or a "call" function. In some embodiments of the system for hooking JNI calls, the JNI dynamic hook is configured to receive a target object, class, method id and method parameters via the call. In some such embodiments, the JNI dynamic hook is further configured to use the class and method id as inputs into the hook lookup function. In some embodiments, the hook lookup function is configured to determine if the class has any static hooks and, if the class has the static hook, to traverse an inheritance hierarchy of the class from child-most to parent-most to identify the target method that corresponds to the method id. In some embodiments, the hook lookup function is configured to return a hook data structure comprising forwarding information for the class and method. Some embodiments of the system include a data structure providing a mapping of target methods to static hook methods via the hook lookup function.

In some embodiments of the system for hooking JNI calls, the call comprises a non-virtual call and the static hook method is further configured to call a native function to forward the call. In some embodiments of the system for hooking JNI calls, the call comprises a non-virtual call and the static hook method is further configured to call one of a C or C++ function to forward the call.

In at least one aspect, the above describes methods for hooking JNI calls using the aforementioned system. In at least one aspect, these methods may be encoded as computer-readable instructions for execution by one or more processors. The computer-readable instructions can be encoded on non-transitory computer-readable media.

In at least one aspect, the above describes a system for static hooking of a Windows Universal application. The system includes an application wrapping tool, executable on a processor, coupled to memory, and configured to identify an install package file stored in storage for a Windows Universal application, modify the identified install package file to inject a new dynamically linked library ("DLL"), include in bytecode of the Windows Universal application one or more calls to the injected new DLL, and generate a modified install package for the Windows Universal application. The injected DLL is loaded in the Windows Universal application as one of a dependency or a reference.

Some embodiments of the system for static hooking of a Windows Universal application include the Windows Universal application configured, upon installation via the modified install package, to load the new DLL into process memory space upon loading of the Windows Universal application. In some embodiments, the application wrapping tool is configured to modify contents of the install package file stored in storage. In some embodiments, the application wrapping tool is configured to modify a binary manifest assembly data, stored in storage, to inject the new DLL. In some embodiments, the application wrapping tool is configured to modify bytecode stored in storage to make the one or more calls to the injected new DLL. In some embodiments, the application wrapping tool is configured to modify Common Intermediate Language ("CIL") bytecode to injected the new DLL for the Windows Universal application comprising a ".NET" executable.

In at least one aspect, the above describes methods for static hooking of a Windows Universal application using the aforementioned system. In at least one aspect, these methods may be encoded as computer-readable instructions for execution by one or more processors. The computer-readable instructions can be encoded on non-transitory computer-readable media.

In at least one aspect, the above describes a system for dynamically hooking of a Windows Universal application. The system includes a Windows Universal application, executable on a processor, coupled to memory and configured to load a plurality of source dynamically loaded libraries (DLLs) in memory. The system further includes a hooking loader configured to load into memory upon execution of the Windows Universal application and initialize a hooking framework. The hooking framework is configured to identify the plurality of source dynamically loaded libraries (DLLs) to hook with a plurality of target DLLs, and the hooking framework is configured to overwrite an address of each of the plurality of source DLLS within an import address table in memory of the Windows Universal Application to point to a corresponding target DLL of the plurality of target DLLs. Responsive to the overwrite, the Windows Universal application becomes configured (while executing in memory) to use the plurality of target DLLs instead of the plurality of source DLLs.

In some embodiments, the hooking loader is configured to pass a name of the Windows Universal application to the hooking framework. In some embodiments, the hooking framework is configured to determine whether to use a hook source DLL whitelist based on at least the name of the Windows Universal application. In some embodiments, the hooking framework is configured to identify the plurality of source DLLs to hook based on a hook source DLL whitelist. In some embodiments, the hooking framework is configured to identify the plurality of source DLLs loaded in a process memory space of the Windows Universal application. In some embodiments, the hooking framework is configured to hook all of the plurality of source DLLS identified in a process memory space of the Windows Universal application.

In at least one aspect, the above describes methods for dynamic hooking of a Windows Universal application using the aforementioned system. In at least one aspect, these methods may be encoded as computer-readable instructions for execution by one or more processors. The computer-readable instructions can be encoded on non-transitory computer-readable media.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A system for hooking Java native interface calls from native code to Java code in a Java virtual machine, the system comprising:
a Java Native Interface ("JNI") dynamic hook executable on a processor, coupled to memory, and configured to intercept a call from native code to a predetermined Java function within a Java Virtual Machine ("JVM");
wherein the JNI dynamic hook is configured to:
determine that a class associated with the predetermined Java function is statically hooked via a hook lookup function,
responsive to the determination, traverse, via the hook lookup function, at least a portion of a hierarchy of the class using a method identifier for the call to the predetermined Java function,
identify, from traversing at least the portion of the hierarchy of the class, a static hook method corresponding to a target method, and
call the static hook method returned by the hook lookup function; and
wherein the static hook method is configured to forward the call to the target method.

2. The system of claim 1, wherein the JNI dynamic hook is configured to be applied to the predetermined Java function comprising one of an "alloc," a "new," or a "call" function.

3. The system of claim 1, further comprising a data structure providing a mapping of target methods to static hook methods via the hook lookup function.

4. The system of claim 1, wherein the JNI dynamic hook is further configured to receive a target object, a class, the method identifier, and method parameters via the call.

5. The system of claim 4, wherein the JNI dynamic hook is further configured to use the class and the method identifier as inputs into the hook lookup function.

6. The system of claim 5, wherein the hook lookup function is configured to traverse the hierarchy of the class in a sequence to identify the target method that corresponds to the method identifier.

7. The system of claim 6, wherein the hook lookup function is configured to return a hook data structure comprising forwarding information for the class and method.

8. The system of claim 1, wherein the call comprises a non-virtual call and wherein the static hook method is further configured to call one of a C or C++ function to forward the call.

* * * * *